(12) United States Patent
Sun et al.

(10) Patent No.: US 12,330,945 B2
(45) Date of Patent: Jun. 17, 2025

(54) GRAPHENE POWDER, AND PREPARATION METHOD THEREFOR AND APPLICATION THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Sai Sun, Shanghai (CN); Siyu Zhang, Shanghai (CN); Wenqian Dong, Shanghai (CN); Huanxin Gao, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 0 days.

(21) Appl. No.: 18/555,904

(22) PCT Filed: Sep. 27, 2021

(86) PCT No.: PCT/CN2021/120924
§ 371 (c)(1),
(2) Date: Oct. 18, 2023

(87) PCT Pub. No.: WO2022/222380
PCT Pub. Date: Oct. 27, 2022

(65) Prior Publication Data
US 2024/0217825 A1    Jul. 4, 2024

(30) Foreign Application Priority Data

Apr. 22, 2021 (CN) .......................... 202110438129.0

(51) Int. Cl.
*C01B 32/19* (2017.01)
*C01B 32/225* (2017.01)

(52) U.S. Cl.
CPC ............ *C01B 32/19* (2017.08); *C01B 32/225* (2017.08); *C01B 2204/22* (2013.01);
(Continued)

(58) Field of Classification Search
CPC ............................. C08K 3/042; C01P 2002/82
See application file for complete search history.

(56) References Cited

U.S. PATENT DOCUMENTS 6,669,919 B1    12/2003   Greinke
10,787,365 B2 *  9/2020   Patole ................... C09D 11/00
(Continued)

FOREIGN PATENT DOCUMENTS

CN    102838110 B    4/2014
CN    105540575 A    5/2016
(Continued)

OTHER PUBLICATIONS

Machine translation CN 108946713 (Year: 2024).*

*Primary Examiner* — Alexandre F Ferre
(74) *Attorney, Agent, or Firm* — NKL Law; Allen Xue

(57) ABSTRACT

A graphene powder, its preparation method and application are provided. The graphene powder is a stack of graphene sheets. The graphene powder involves in its Raman spectrum a D peak and a G peak with peak heights of $I_D$ and $I_G$ respectively, where $I_D/I_G$ is 0.10 or less. The graphene powder can be applied in conductive composite materials, anti-corrosion coatings, heat dissipation composite materials. In particular, when used in lithium-ion batteries, it can (Continued)

significantly reduce electrode internal resistance and improve battery stability at any current rates.

12 Claims, 11 Drawing Sheets

(52) U.S. Cl.
CPC ...... *C01B 2204/24* (2013.01); *C01B 2204/30* (2013.01); *C01B 2204/32* (2013.01); *C01P 2002/72* (2013.01); *C01P 2002/82* (2013.01); *C01P 2004/03* (2013.01); *C01P 2004/04* (2013.01); *C01P 2006/11* (2013.01)

(56) References Cited

U.S. PATENT DOCUMENTS

| | | |
|---|---|---|
| 2017/0349763 A1 | 12/2017 | Wu et al. |
| 2019/0330067 A1 | 10/2019 | Pacheco Benito et al. |
| 2019/0382272 A1 | 12/2019 | Kroeger et al. |
| 2020/0123011 A1 * | 4/2020 | He .................. C01B 32/19 |

FOREIGN PATENT DOCUMENTS

| | | | |
|---|---|---|---|
| CN | 107827102 A | 3/2018 | |
| CN | 108530669 A | 9/2018 | |
| CN | 108622886 A | 10/2018 | |
| CN | 108822251 A | 11/2018 | |
| CN | 108946713 A | 12/2018 | |
| CN | 109052380 A | 12/2018 | |
| CN | 109715555 A | 5/2019 | |
| CN | 110342503 A | 10/2019 | |
| CN | 110963491 A | 4/2020 | |
| CN | 107539973 B | 8/2020 | |
| CN | 111534177 A | 8/2020 | |
| KR | 102240358 B1 | 4/2021 | |
| RU | 2552477 C2 | 6/2015 | |
| RU | 2591942 C2 | 7/2016 | |
| RU | 2682166 C2 | 3/2019 | |
| WO | WO-2017125592 A1 * | 7/2017 | ........... C01B 32/205 |
| WO | 2022222380 A1 | 10/2022 | |

* cited by examiner

GRAPHENE POWDER, AND PREPARATION METHOD THEREFOR AND APPLICATION THEREOF

TECHNICAL FIELD

The present disclosure relates to a graphene material, particularly to a graphene powder as well as its preparation and application.

BACKGROUND

Graphene is a type of carbon material having a single-layer two-dimension honeycomb lattice structure formed by the connection of $sp^2$ hybridized carbon atoms. It may have ultra-high conductivity (with an electron mobility of 10000 $cm^2/(V \cdot s)$) and thermal conductivity (about 5000 W/(m·K)), as well as large specific surface area. It may be broadly applied in fields such as electronics, aerospace, military, new energy, and the like. It may be expected to trigger a new revolution in modern electronic technology. After years of research and development, significant breakthroughs have been made in the large-scale production technology, processing equipments, and product quality of graphene. However, there are still many key technologies to be solved. For example, the current methods for preparing graphene powder used by many enterprises are still oxidation-reduction methods, which may involve a large number of strong acids and oxidant substances, causing serious pollution problems. At the same time, the graphene powder produced contains a large number of defects, with uncontrollable product quality, which limits downstream applications and seriously restricts the industrialization of graphene.

CN102838110B proposes a process comprising subjecting a mixture powder of magnesium powder and carbonate powder to burning and synthesizing to obtain a graphene powder. The process is simple in operation, and applicable in a continuous producing. However, the process requires high purity of magnesium powder. Graphene relies on carbonates as a carbon source, which results in poor economic performance. Moreover, graphene powder may have low crystalline degree and quality. Accordingly, downstream applications are limited to some extent.

CN107539973B proposes a process comprising subjecting raw materials of graphite, an intercalation expanding agent and chlorosulfonic acid to ultrasonic delaminating to obtain graphene slurry which is subjected to freeze-drying to obtain a graphene powder. The graphene obtained by the process may have a complete crystal structure. The process is simple and cost-effective. However, the ultrasonic delaminating may have low efficiency and poor treatment consistency, with difficulty in removing impurities other than carbon ions from the product, making it difficult for large-scale applying.

CN105540575A discloses a method for preparing graphene by using high-pressure homogenizer delamination, wherein a raw material of graphite, an intercalation agent and a dispersant was treated under a high-pressure homogenizer to obtain a graphene powder. The method may have a high yield of graphene. However, the method is complex and requires a large amount of organic solvents, which pollutes the environment. At the same time, the intercalation agent in the solution may remain in graphene products, making it difficult to purify and thereby adversely affecting the quality of graphene products. Accordingly, the products may be difficultly applied in large scale in downstream enterprises such as lithium-ion batteries.

Therefore, developing graphene powder with excellent dispersion performance, simple preparation, low cost, and high quality is a technical challenge in the art.

SUMMARY OF THE INVENTION

The subject of the invention is to solve one or more problems associated with graphene powders in the prior art, such as low conductivity, uneven dispersion in solvents, easy agglomeration, complex in preparation, and the like. Therefore, provided in the present disclosure is a graphene powder, its preparation method and application. The graphene powder in accordance with the present disclosure has advantages such as few defects, high conductivity and the like, and can be applied in conductive composite materials, anti-corrosion coatings, heat dissipation composite materials. In particular, when used in lithium-ion batteries, it can significantly reduce electrode's internal resistance and improve battery's stability at any current rates.

In the first aspect of the present disclosure, provided is a graphene powder which is a stack of graphene sheets, wherein the graphene powder involves in its Raman spectrum a D peak and a G peak with peak heights of $I_D$ and $I_G$ respectively, where $I_D/I_G$ is 0.10 or less.

In the second aspect of the present disclosure, provided is a method for preparing the graphene powder, comprising the steps of:
  (1) subjecting an expandable graphite to pre-expanding, to obtain a pre-expanded graphite;
  (2) mixing the pre-expanded graphite obtained in step (1) with a wetting agent and a solvent, and then subjecting the mixture to a first high-pressure homogenization and a second high-pressure homogenization, to obtain a slurry containing the graphene powder, wherein the pressure of the second high-pressure homogenization is 10-20 MPa higher than the pressure of the first high-pressure homogenization;
  (3) drying the slurry containing the graphene powder obtained in step (2), to obtain the graphene powder.

In the third aspect of the present disclosure, provided is a use of the graphene powder or that prepared by the method in a conductive composite material.

In the fourth aspect of the present disclosure, provided is a use of the graphene powder or that prepared by the method in an anti-corrosion coating.

In the fifth aspect of the present disclosure, provided is a use of the graphene powder or that prepared by the method in a heat dissipation composite material.

Compared with the prior art, the invention achieves the following technical effects:

(1) The graphene powder in accordance with the present disclosure is composed of a stack of graphene sheets. Preferably, the graphene sheets are loosely accumulated, leaving voids in the stack. Accordingly, the graphene powder in accordance with the present disclosure may have a large contact surface with solvents and good dispersibility in both water-based and oil-based solvents. When in use, the stack may be dispersed into corresponding graphene sheets. The graphene powder in accordance with the present disclosure and the corresponding graphene sheets formed by dispersion may have characteristics such as high purity, few defects, high conductivity and the like. The graphene powder in accordance with the present disclosure may be advantageously applied in fields such as conductive composite materials, anti-corrosion coatings (especially epoxy resin anti-corrosion coatings), heat dissipation composite materials, and the like. For example, when the graphene powder in accordance with the present disclosure is used in anti-corrosion coatings, it may significantly reduce zinc content but improve the anti-corrosion performance of the coatings. When the graphene powder in accordance with the present disclosure is applied in heat dissipation coatings, it may significantly improve the thermal conductivity of the obtained heat dissipation film in the X and Y directions. The graphene powder in accordance with the present disclosure is particularly suitable for use as conductive agents in lithium batteries. The graphene sheets contained in the graphene powder in accordance with the present disclosure are complete and have a large radial size. Therefore, when using the graphene powder in accordance with the present disclosure as a conductive agent, the dispersed large-size graphene sheets may increase the contact area between them and electrode active material(s). It may provide more pathways in the electrode active material(s) for transferring electrons and thereby facilitate the formation of a network for the planar conduction of electrons inside the obtained electrode. It may reduce the internal resistance of the electrode, and improve the rate performance and stability of the battery.

(2) The preparation method in accordance with the present disclosure adopts a homogenization with pressures increased in gradient, optionally selecting a specific wetting agent and optionally selecting an appropriate expansion factor for expanding graphite, in delaminating graphite layer-by-layer. The lattice integrity of graphene in the graphene sheets is better preserved. Therefore, in the obtained graphene powder, the graphene sheets are relatively complete and have a larger radial size, thinner thickness, higher purity, few defects, and higher conductivity. In addition, the method for preparing the graphene powder in accordance with the present invention does not require the use of reagents such as oxidants, strong acids, strong bases, and the like, making it green and environmentally friendly.

DETAILED DESCRIPTION

Figure 1:
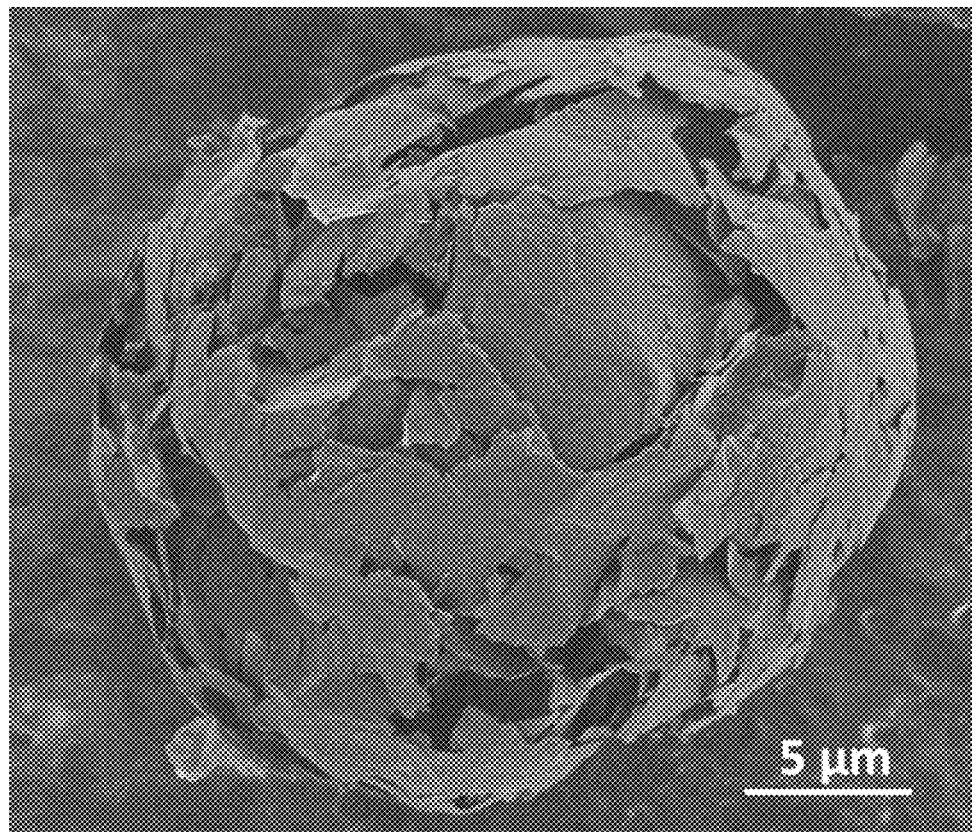
FIG. 1 is a SEM image of the graphene powder G-1 obtained in Example 1.

It should be understood that the endpoints and any value in the ranges disclosed herein are not limited to the precise ranges or values, but encompass values close to those ranges or values.

For ranges of values, it is possible to combine between the endpoints of each of the ranges, between the endpoints of each of the ranges and the individual points, and between the individual points to give one or more new ranges of values as if these ranges of values are specifically disclosed herein.

Other than in the examples, all numerical values of parameters in this specification are to be understood as being modified in all instances by the term "about" whether or not "about" actually appears before the numerical values.

As used in this specification, the term "graphene" refers to a two-dimensional material composed of a single layer of $sp^2$ hybridized carbon atoms accumulated into a honeycomb structure. Graphene is usually prepared by mechanical delaminating, oxidation-reduction, SiC epitaxial growth, and the like. Therefore, the term "graphene" also includes graphene oxide, reduced graphene oxide, and the like.

As used in this specification, the term "graphene sheet" refers to a layered assembly of graphene, which may contain one or more layers of graphene. Accordingly, graphene sheets include single-layer graphene (which can be simply referred to as graphene), double-layer graphene, as well as low-layer graphene comprising 3-10 layers of graphene. It is generally believed that when the number of layers is less than or equal to 10, the layered assembly of graphene has properties similar to those of graphene (single-layer graphene). When the number of layers exceeds 10, the properties of the layered assembly of graphene are similar to those of graphite. The thickness of graphene sheets is at nanometer scale, and the other two dimensions are usually larger than nanometer scale.

As used in this specification, the term "expandable graphite" refers to a graphite material that can be used to form a wormlike expanded graphite. For example, by chemical or physical measures (such as heating), the graphite layers of the graphite material expand along the Z-axis direction at a high ratio (such as an expanding ratio of 100-400 times), thereby forming the wormlike expanded graphite. "Expandable graphite" and "graphite interlayer compounds" may have the same meaning.

In one aspect of the present disclosure, provided is a graphene powder which is a stack of graphene sheets, wherein the graphene powder involves in its Raman spectrum a D peak and a G peak with peak heights of $I_D$ and $I_G$ respectively, where $I_D/I_G$ is 0.10 or less. In one variant, $I_D/I_G$ may be 0.01-0.10, preferably 0.03-0.10, for example, but not limited to 0.01, 0.02, 0.03, 0.04, 0.05, 0.06, 0.07, 0.08, 0.09, 0.10 and the like. In one variant, there are voids in the graphene powder, such as voids between graphene sheets or within graphene sheets. The presence of voids means that the connection between the graphite layers is broken. In one variant, the graphene powder has a particle size of 15-35 μm.

Raman spectroscopy is widely used in analyzing carbon materials. The Raman spectrum of graphene materials may be composed of several peaks, mainly G, D and G'. G peak is the main characteristic peak of graphene, which is attributable to the in-plane vibration of $sp^2$ hybridized carbon atoms. It can effectively reflect the number of graphene layers in the graphene samples. D peak is usually regarded as the disordered vibration peak of graphene, which is used to characterize structural defects in the graphene samples. G' peak, also known as 2D peak, is a two-phonon resonance second-order Raman peak, which may be used to characterize the mode of interlayer stacking of carbon atoms in the graphene samples. In the Raman spectrum of the graphene powder, there are a D peak in the wavelength range of 1250-1450 $cm^{-1}$ with a peak height of $I_D$, a G peak in the wavelength range of 1500-1700 $cm^{-1}$ with a peak height of $I_G$, and a 2D peak in the wavelength range of 2600-2800 $cm^{-1}$ with a peak height of $I_{2D}$. Raman spectroscopy has advantages in characterizing the defects of graphene materials. It is generally believed that the defect density is proportional to $I_D/I_G$. The graphene powder has a lower $I_D/I_G$, indicating fewer defects therein.

The graphene powder may have a conductivity of 500-5000 S/cm, preferably 1500-4000 S/cm, and further preferably 2000-3500 S/cm, for example, but not limited to 2000, 2100, 2200, 2300, 2400, 2500, 2600, 2700, 2800, 2900, 3000, 3100, 3200, 3300, 3400, 3500, 3600, 3700, 3800, 3900, 4000, and the like.

The graphene powder may have a specific surface area of 50-300 $m^2/g$, preferably, 100-250 $m^2/g$.

The graphene powder may have a tap density of 0.02-0.04 $g/cm^3$.

Based on mass of the graphene powder, the graphene powder may have a carbon content of equal to or greater than 99.50%, preferably 99.80-99.95%, and an oxygen content of 300 ppm or below.

In one embodiment, in the stack of graphene sheets, the graphene sheets comprise 1-10 layers of graphene. In one variant, the total thickness is 0.5-3.0 nm. In one variant, in the stack of graphene sheets, the graphene sheets have a median particle size of 5-15 μm, preferably 8-15 μm. The median particle size of the graphene sheets characterizes the maximum dimensional size of the graphene sheets. As mentioned above, the graphene sheets have a thickness at the nanoscale with the other two dimensions usually larger than the nanoscale. Correspondingly, the median particle size of the graphene sheets characterizes the dimension on the length/width (X-Y) directions.

In the Raman spectrum of the graphene sheets, there are a D peak and a G peak with peak heights of $I_D$ and $I_G$ respectively, where $I_D/I_G$ is 0.10 or less. In one variant, $I_D/I_G$ may be 0.01-0.10, preferably 0.03-0.10, for example, but not limited to 0.01, 0.02, 0.03, 0.04, 0.05, 0.06, 0.07, 0.08, 0.09, 0.10 and the like.

In the Raman spectrum of the graphene sheets, there are a D peak in the wavelength range of 1250-1450 $cm^{-1}$ with a peak height of $I_D$, a G peak in the wavelength range of 1500-1700 $cm^{-1}$ with a peak height of $I_G$, and a 2D peak in the wavelength range of 2600-2800 $cm^{-1}$ with a peak height of $I_{2D}$. The graphene sheets have a lower $I_D/I_G$, indicating fewer defects therein.

The graphene sheets exhibit the following behaviors in a thermogravimetric analysis. When subjected to a heat treatment under an air atmosphere, the graphene sheets have a starting temperature for thermal decomposition of greater than or equal to 600° C., and preferably greater than or equal to 700° C. In one variant, when subjected to a heat treatment under an air atmosphere at 800° C., the graphene sheets have a thermal-loss rate of less than or equal to 10%, preferably less than or equal to 8%, more preferably less than or equal to 5%, where the thermal-loss rate is (weight of graphene sheets before heat treatment—weight of graphene sheets after heat treatment)/weight of graphene sheets before heat treatment. The starting temperature for thermal decomposition is negatively correlated with the impurity content of the graphene material sample. In this regard, the higher the starting temperature, the lower the impurity content of the graphene material sample. The thermal-loss rate is positively correlated with the impurity content of the graphene material sample. In this regard, the smaller the thermal-loss rate, the lower the impurity content of the graphene material sample.

The graphene sheets may have a conductivity of 500-5000 S/cm, preferably 1500-4000 S/cm, and further preferably 2000-3500 S/cm, for example, but not limited to 2000, 2100, 2200, 2300, 2400, 2500, 2600, 2700, 2800, 2900, 3000, 3100, 3200, 3300, 3400, 3500, 3600, 3700, 3800, 3900, 4000, and the like.

In another aspect of the present disclosure, provided is a method for preparing the graphene powder, comprising the steps of:
(1) subjecting an expandable graphite to pre-expanding, to obtain a pre-expanded graphite;
(2) mixing the pre-expanded graphite obtained in step (1), a wetting agent and a solvent, and then subjecting the mixture to a first high-pressure homogenization and a second high-pressure homogenization, to obtain a slurry containing the graphene powder, wherein pressure of the second high-pressure homogenization is 10-20 MPa higher than the pressure of the first high-pressure homogenization;

(3) drying the slurry containing the graphene powder obtained in step (2), to obtain the graphene powder.

In one variant, compared to the expandable graphite, the pre-expanded graphite obtained in step (1) has an expansion ratio of 200-300 times.

Preferably, step (1) may include the steps of: heating the expandable graphite to 800-950° C., subjecting to expanding for 10-60 seconds, to obtain the pre-expanded graphite. In one variant, the expandable graphite may have a particle size of 70-100 mesh.

In one variant, the wetting agent in step (2) is fatty amine polyoxyethylene ether. Preferably, the fatty amine polyoxyethylene ether may have a HLB value of greater than or equal to 12.

Preferably, the pre-expanded graphite obtained in step (1) and the wetting agent are fed in a mass ratio of 1:0.01-0.1 in step (2). The solvent may be one or more of water or ethanol. The slurry containing the graphene powder may have a solid content of 0.5-5.0 wt %.

More preferably, in step (2), the first high-pressure homogenization is operated at a pressure of 30-40 MPa for 20-60 minutes. The second high-pressure homogenization is operated at a pressure of 40-50 MPa for 10-30 minutes.

In a variant, the graphene powder obtained in step (3) may have a solvent residue level of less than or equal to 0.1 wt %.

Preferably, the drying in step (3) is preferably spray drying or freeze drying. In one variant, the spray drying is operated under conditions of: the air inlet temperature being 300-350° C., the air inlet temperature being 200-250° C. higher than the air outlet temperature, the air outlet temperature being 100-130° C., and the rotating speed of the centrifugal disc of the spray drying equipment being 20000-30000 rpm. In one variant, the freeze-drying is operated under conditions of: the cold trap temperature being not higher than −65° C., preferably −75 to −70° C.; the temperature of the cubical separator being not higher than −55° C., preferably −65 to −60° C.; the heating rate being 0.1-0.5° C./min; the time for heating from the temperature of the cubical separator to 0° ° C. being not less than 24 hours, preferably 26-30 hours; and the vacuum degree being not higher than 10 Pa, preferably 0.5-5 Pa.

The graphene powder in accordance with the present disclosure has characteristics such as good dispersibility, high purity, few defects, high conductivity and the like. It may be advantageously applied in fields such as conductive composite materials, anti-corrosion coatings (especially epoxy resin anti-corrosion coatings), heat dissipation composite materials, and the like.

In this regard, in a further aspect of the present disclosure, provided are uses of the graphene powder in accordance with the present disclosure in a conductive composite material; in an anti-corrosion coating, especially in an epoxy resin anti-corrosion coating; and in a heat dissipation composite material.

The graphene powder in accordance with the present disclosure may be used in a lithium-ion battery. The lithium-ion battery may have a structure well known to those skilled persons in the art. In general, the lithium-ion battery may comprising a negative electrode, a positive electrode, a separator and an electrolyte. The separator may be disposed between the positive electrode and the negative electrode. The positive electrode contains a positive active material and the negative electrode contains a negative active material. There is not any special limitation on the specific composition of the positive active material. It may be a lithium-containing positive active material commonly used in the art. There is not any special limitation on the specific composition of the negative active material. Preferably, it is a silicon-carbon negative material. The graphene powder in accordance with the present disclosure may be used as a conductive agent, in combination with the negative or positive active materials, in the corresponding battery electrode.

The separator may be selected from various separators known to those skilled persons in the art and commonly used in lithium-ion batteries, such as polypropylene microporous films, polyethylene mat, glass fiber mat or ultra-fine glass fiber paper.

The electrolyte may be various conventional electrolytes, such as non-aqueous electrolyte. The non-aqueous electrolyte is a solution formed by an electrolyte lithium salt in a non-aqueous solvent. Any traditional non-aqueous electrolyte known to those skilled persons in the art may be used. For example, the electrolyte lithium salt may be at least one selected from the group consisting of lithium hexafluorophosphate ($LiPF_6$), lithium perchlorate ($LiClO_4$), lithium tetrafluoroborate ($LiBF_4$), lithium hexafluoroarsenate ($LiAsF_6$) and lithium hexafluorosilicate ($LiSiF_6$). The non-aqueous solvents may be selected from the group consisting of linear esters and cyclic esters and mixtures thereof. The linear esters may be at least one selected from the group consisting of dimethyl carbonate (DMC), diethyl carbonate (DEC), methyl ethyl carbonate (EMC), methyl propyl carbonate (MPC) and dipropyl carbonate (DPC). The cyclic esters may be at least one selected from the group consisting of ethylene carbonate (EC), propylene carbonate (PC) and vinylene carbonate (VC).

Tests for Structures and Performances

In the present disclosure, scanning electron microscopy (SEM) is used to characterize morphology of the material samples. Specifically, the scanning electron microscope used is TECNALG2F20 (200 kv) from FEI company, US. Tests are operated by: pressing the sample directly on the sample table containing a conductive tape, and then inserting into the electron microscope for observation. A magnification of 8,000 times is used for observation.

In the present disclosure, morphology of the material samples is characterized using JEM-2100 transmission electron microscopy (TEM, HR-TEM) from Japan Electronics Corporation. Tests are operated by: placing the sample on a copper support mesh, and then inserting into the electron microscope for observation. Magnifications of 17,000 and 380,000 times are used for observation.

In the present disclosure, the median particle size of the graphene sheets is characterized through dynamic light scattering by using laser particle size analyzer MS-3000 from Malvern Panalytical. Tests are operated by: dispersing the sample with deionized water to a concentration of 0.01 mg/ml, and subjecting to testing after 10 minutes of ultrasonic treating. The analyzer is set with a shading range of 5-20%.

In the present disclosure, XRD analysis of the material samples is operated using the D/max-2200/PC X-ray diffractometer from Nippon Institute of Science. The conditions of testing include: 2θ testing range of 10-70°, scanning speed of 6°/min, tube voltage of 40 KV, current of 40 mA, and Cu-Kα radiation source.

In the present disclosure, the specific surface area of the material samples is measured using ASAP2010 specific surface area and pore size distribution tester from Micromeritics, US. Test conditions include a temperature of 77K and a nitrogen atmosphere.

In the present disclosure, thermal-loss curve is measured using a Pyris1 thermogravimetric analyzer from Perkin-Elmer, US, under an air atmosphere with a heating rate of 20° C./min.

In the present disclosure, Raman spectrum is tested by using a laser with a wavelength of 785 nm as excitation source. Used is Invia/Reflrx Laser Micro-Raman spectrometer wherein the material samples were placed on the slide.

In the present disclosure, expansion ratio is measured by: weighting a certain amount of expandable graphite and detecting volume of the same using a measuring cylinder. As mentioned above, the expandable graphite is subjected to pre-expanding to obtain the pre-expanded graphite. After the pre-expanded graphite cooled to room temperature, the volume of the same is detected with a measuring cylinder. The expansion ratio is calculated according to the following equation:

$$\text{expansion ratio} = (\text{volume of the pre-expanded graphite} - \text{volume of the expandable graphite})/\text{volume of the expandable graphite}.$$

In the present disclosure, solvent residue level is measured by: taking 1 g of the obtained graphene powder as a sample, subjecting the sample to drying in a vacuum oven at 60° C. for 10 hours, and weighing. The solvent residue level is calculated according to the following equation:

$$\text{solvent residue level \%} = (1 - \text{weight of the sample after drying in grams})/1 \times 100\%.$$

In the present disclosure, tape density is measured using the FT-100E multifunctional tape density tester from Rico instrument technology Co., LTD, with a testing frequency of 200 Hz and a vibration frequency of 5000 times.

In the present disclosure, conductivity is measured using ST-2258C multifunctional digital four probe tester from Suzhou Jingge Electronic Co., Ltd. The samples are prepared by compression. Specifically, samples of the obtained graphene powder are compressed into tablets of 100 μm at a pressure of 10 MPa, which is subjected to testing with the tester.

In the present disclosure, oxygen content and carbon content are measured using FlashSmart-1120265 elemental analyzer from ThermoFisher, with He gas as the carrier gas and an injection volume of 1 mg.

In the present disclosure, electrochemical properties of the lithium-ion batteries obtained after the assembling are tested with the Wuhan blue battery test system (CT2001B). The test conditions include: a voltage range of 0.005V-2V and a current range of 0.05A-2A. Each sample is assembled into 10 coin cells. Their battery performances are tested under the same voltage and current. The average value thereof is used as the measured result.

In the present disclosure, neutral salt spray test is operated using Q-FOG cyclic corrosion tester from Q-Lab Company, US, in accordance with HG/T5573-2019. The test is operated by: spraying a saline containing (5±0.5)% sodium chloride with pH of 6.5-7.2 through the spray device, depositing salt spray on the test piece to be tested with the marking lines. After 1440 h, the corrosion state of the marking lines on the surface is observed. The corrosion resistance is determined by detecting the corrosion distance of the marking lines.

EXAMPLES

The invention will be described in detail below through the following examples.

In the following Examples and Comparative Examples, the room temperature referred to 25° C.

In the following Examples and Comparative Examples, expandable graphite was E-196403 from Aladdin Reagent Co., Ltd. The wetting agent was Surfonic T-10 from Huntsman Chemical Trading Co., Ltd.

Example 1

(1) 100 g (75 mesh) of the expandable graphite was subjected to pre-expanding at 900° C. for 20 seconds to obtain a pre-expanded graphite. As measured by the tests described above, the pre-expanded graphite had an expansion ratio of 220 times.

(2) 10 g of the pre-expanded graphite obtained in step (1), 0.25 g of wetting agent (Surfonic T-10, with HLB of 12.4, a fatty amine polyoxyethylene ether), 239.75 g of deionized water were added together into a high-pressure homogenizer to homogenize at 30 MPa for 30 min, and then homogenize at an increased pressure of 45 MPa for 30 min, to obtain a slurry containing graphene powder.

(3) The slurry was subjected to drying in a spray drying equipment, wherein the air inlet temperature was 350° C., the air outlet temperature was 100° C., the rotating speed of the centrifugal disc of the spray drying equipment was 20000 rpm. The powder collected at the outlet was graphene powder G-1.

FIG. 1 was a SEM image of the graphene powder G-1 obtained in Example 1. As can be seen from FIG. 1, G-1 was in a structure formed by the accumulating of graphene sheets, with a particle size of 20-30 μm. There were voids between the graphene sheets.

Figure 2:
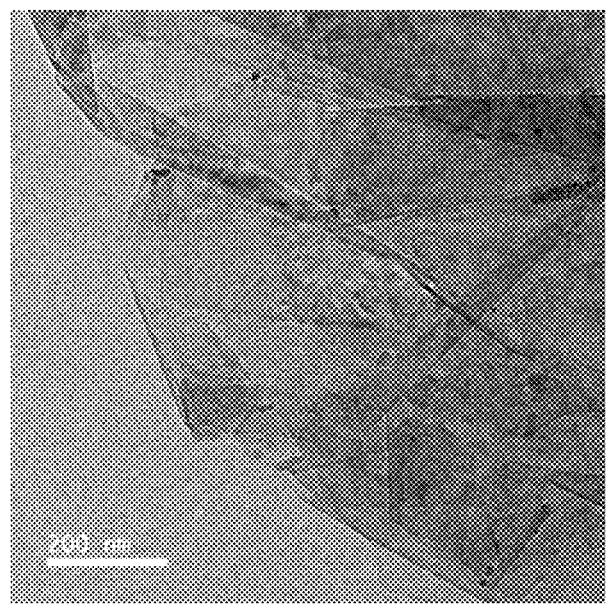
FIG. 2 is a TEM image of the graphene powder G-1 obtained in Example 1.

FIG. 2 was a TEM image of the graphene powder G-1 obtained in Example 1. As can be seen from FIG. 2, the graphene sheets were in a state of being accumulated, which was consistent with the results obtained from the SEM image in FIG. 1. It indicated that G-1 was a stack of the accumulated graphene sheets.

Figure 3:
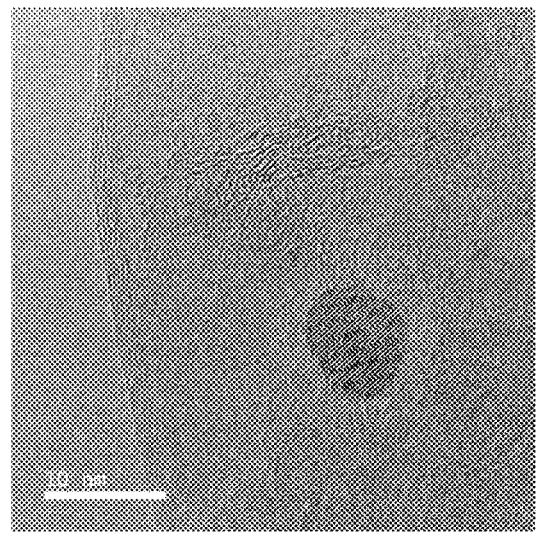
FIG. 3 is a HR-TEM image of the graphene powder G-1 obtained in Example 1.

FIG. 3 is a HR-TEM image of the graphene powder G-1 obtained in Example 1. As shown by the lattice stripes in FIG. 3, the graphene sheets in G-1 were a few-layer graphene with 4-6 layers of graphene, with a thickness of approximately 1.2 nm-1.9 nm. The graphene sheets had a median particle size of 8.5 μm.

Figure 4:
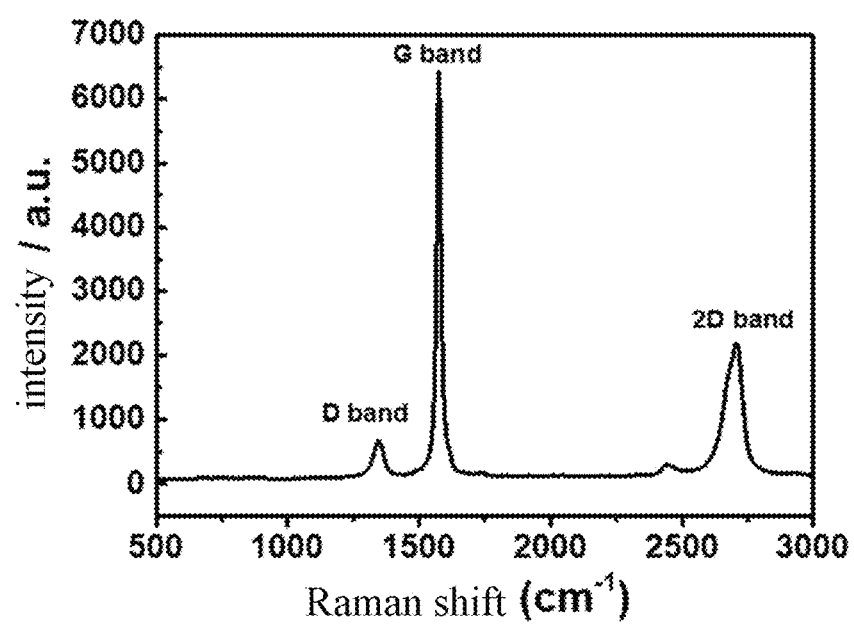
FIG. 4 is a Raman spectrum of the graphene powder G-1 obtained in Example 1.

FIG. 4 is a Raman spectrum of the graphene powder G-1 obtained in Example 1. As can be seen from FIG. 4, the graphene powder involved a D peak at 1354 $cm^{-1}$ and a G peak at 1574 $cm^{-1}$ with a ratio of their peak heights ($I_D/I_G$) of 0.09, indicating that G-1 had fewer defects. In addition, G-1 also showed a significant 2D peak at 2709 $cm^{-1}$, confirming that G-1 was a stack of few layers of graphene. It was consistent with the results in FIG. 3.

Figure 5:
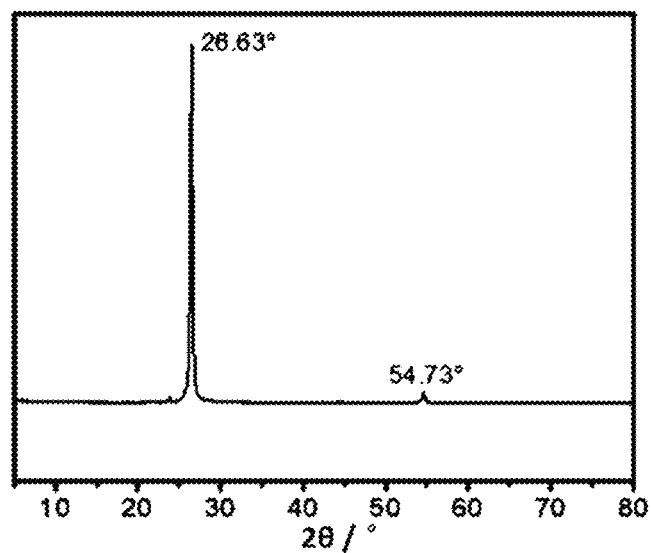
FIG. 5 is a XRD spectrum of the graphene powder G-1 obtained in Example 1.

FIG. 5 is a XRD spectrum of G-1. It only showed a significant diffraction peak at 26.63°, without any impurity peaks. It indicated that G-1 involved no impurity phase formed by oxidizing or by doping of impurity elements.

As measured by the test with the elemental analyzer, G-1 obtained in Example 1 had a carbon content of 99.95 wt %, and an oxygen content of 140 ppm.

As measured by the tests described above, G-1 had a starting temperature for thermal decomposition of 640° C., a thermal-loss rate of 6.5% at 800° C., a conductivity of 3200 S/cm, a tap density of 0.028 g/cm$^3$, a specific surface area of 180 m$^2$/g, and a solvent residue level of 0.1%.

Figure 19:
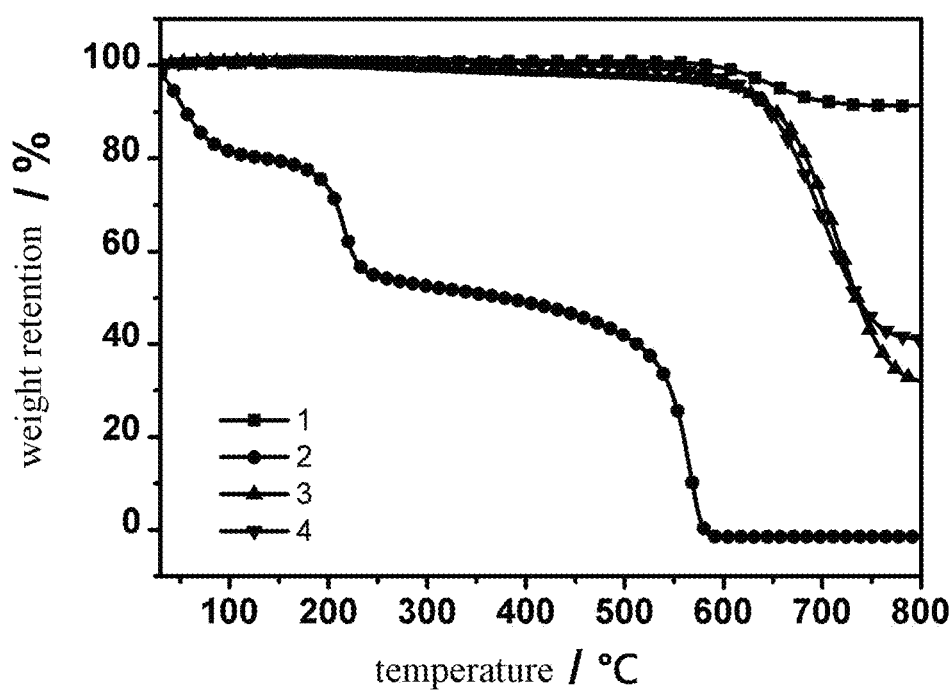
FIG. 19 shows the thermal-loss curves of different graphene material samples under air atmosphere, wherein 1 is the graphene powder G-1 obtained in Example 1, 2 is a commercially available graphene powder (prepared by a physical method), 3 is a commercially available graphene oxide, and 4 is a commercially available reduced graphene oxide.

The thermal-loss curve of the graphene powder G-1 obtained in Example 1 was shown in FIG. 19, marked as 1. For comparison, commercially available products were used as comparative samples, whose thermal-loss data and SEM images were obtained and showed in FIG. 19-FIG. 22. The comparative sample 2 (simply marked as 2 in the figure) was graphene powder (a graphene powder prepared by a physical method) from Shanghai carbon source valley new material technology co., LTD. The comparative sample 3 (simply marked as 3 in the figures) was SE-3521 (a graphene oxide powder) from the Sixth Element Changzhou Materials Technology Co., Ltd. The comparative sample 4 (simply marked as 4 in the figures) was SE-1430 (a reduced graphene oxide powder) from the Sixth Element Changzhou Materials Technology Co., Ltd. As shown in FIG. 19, the comparative sample 2 had a starting temperature for thermal decomposition of 560° C., and a thermal-loss rate of 57% at 800° C. The comparative sample 3 had a starting temperature for thermal decomposition of 420° C., and a thermal-loss rate of 68% at 800° C. The comparative sample 4 had a starting temperature for thermal decomposition of 50° C., and a thermal-loss rate of 98% at 800° C.

Figure 20:
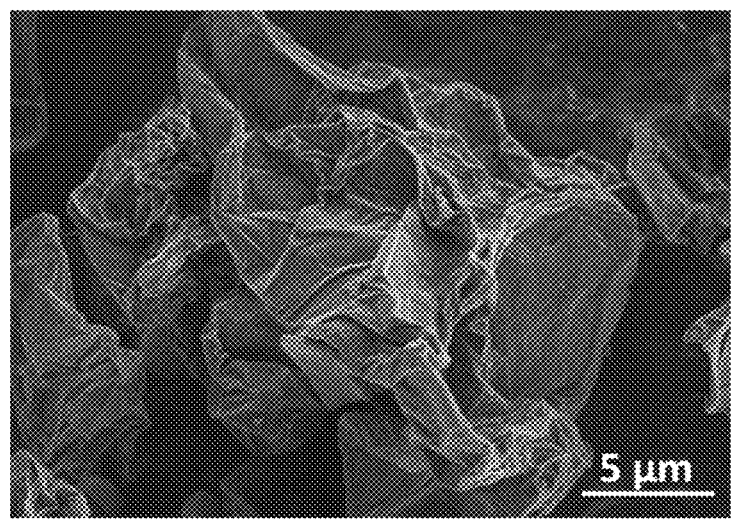
FIG. 20 shows a SEM image of the commercially available graphene powder (prepared by a physical method)

FIG. 20 was a SEM image of the comparative sample 2. As shown in FIG. 20, graphene sheets in the comparative sample had more layers and were tightly connected, with no voids between the graphene sheets. Such structure was disadvantageous for solvent wetting, resulting in difficulty in dispersion of graphene.

Figure 21:
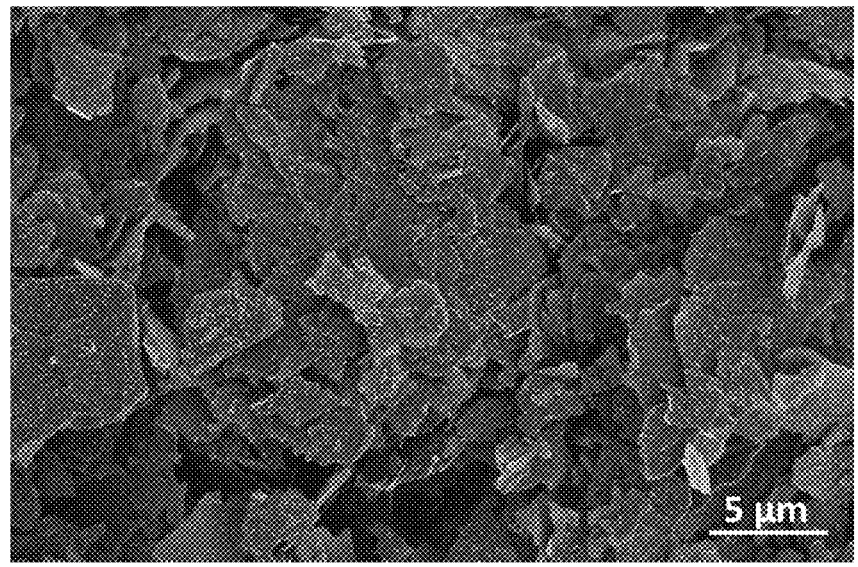
FIG. 21 shows a SEM image of the commercially available graphene oxide.

FIG. 21 was a SEM image of the comparative sample 3. As shown in FIG. 21, the comparative sample was formed from the accumulating of several graphene material sheets, wherein the sheets had a large thickness. The comparative sample contained many spherical particle impurities, resulting in low purity.

Figure 22:
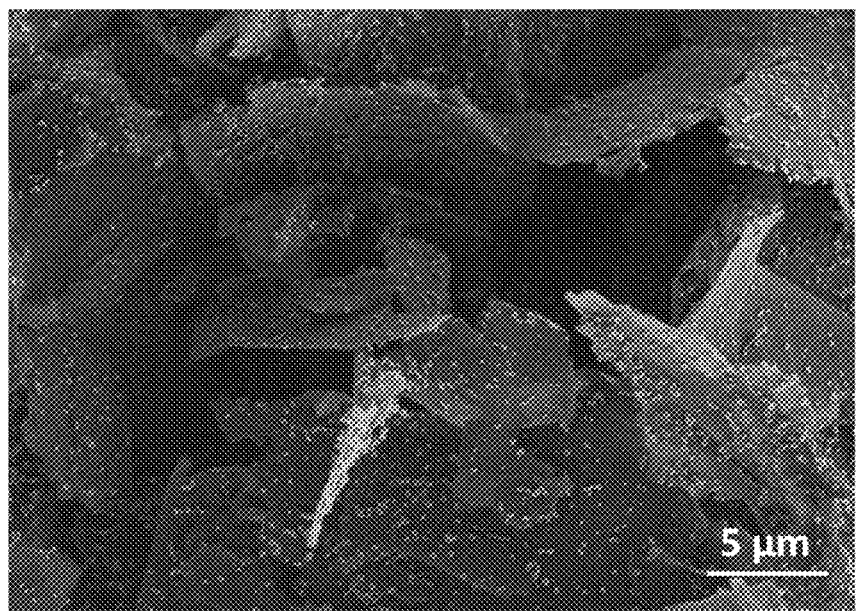
FIG. 22 shows a SEM image of the commercially available reduced graphene oxide.

FIG. 22 was a SEM image of the comparative sample 4. As shown in FIG. 22, the comparative sample was also formed from the accumulating of several graphene material sheets, wherein the sheets had a large thickness. The comparative sample contained many spherical particle impurities, resulting in low purity.

Assembling

The graphene powder G-1 obtained in Example 1 was added as a conductive agent into the negative electrode for a lithium-ion battery. In the lithium-ion battery, the positive electrode is a metal lithium sheet, the separator is a polypropylene microporous film, the electrolyte is a 1 mol/L lithium hexafluorophosphate (LiPF$_6$) solution (wherein a mixture of vinyl carbonate and diethyl carbonate in a ratio of 3:7 by volume was used as solvents). The negative electrode comprises the graphene powder G-1 obtained in Example 1 as a conductive agent and a silicon-carbon negative active material with a design capacity of 500 mAhg$^{-1}$, wherein the conductive agent and the silicon-carbon negative active material were in a mass ratio of 1:8. A CR2016 coin cell was assembled.

The assembled coin cell was subjected to the tests as described above to characterize the cycle performances at different current rates. The results were shown in FIG. 9.

Example 2

(1) 100 g (75 mesh) of the expandable graphite was subjected to pre-expanding at 900° C. for 20 seconds to obtain a pre-expanded graphite. As measured by the tests described above, the pre-expanded graphite had an expansion ratio of 220 times.

(2) 10 g of the pre-expanded graphite obtained in step (1), 0.25 g of wetting agent (Surfonic T-10, with HLB of 12.4), 239.75 g of deionized water were added together into a high-pressure homogenizer to homogenize at 30 MPa for 30 min, and then homogenize at an increased pressure of 45 MPa for 30 min, to obtain a slurry containing graphene powder.

(3) The slurry was subjected to drying in a freeze-drying equipment, wherein the temperature of the cold trap was −75° C., the temperature of the cubical separator was −60° C., and the heating rate was 0.5° C./min. The temperature was kept at −60° C., −50° C., −40° C., −20° C., −10° C., and 0° C. for 12 hours, 4 hours, 4 hours, 2 hours, 2 hours, and 2 hours, respectively. The vacuum degree inside the cubic remained at 5 Pa throughout the entire treatment. After the temperature of the cubical separator returned to room temperature, the obtained product was taken out and named as G-2.

Figure 6:
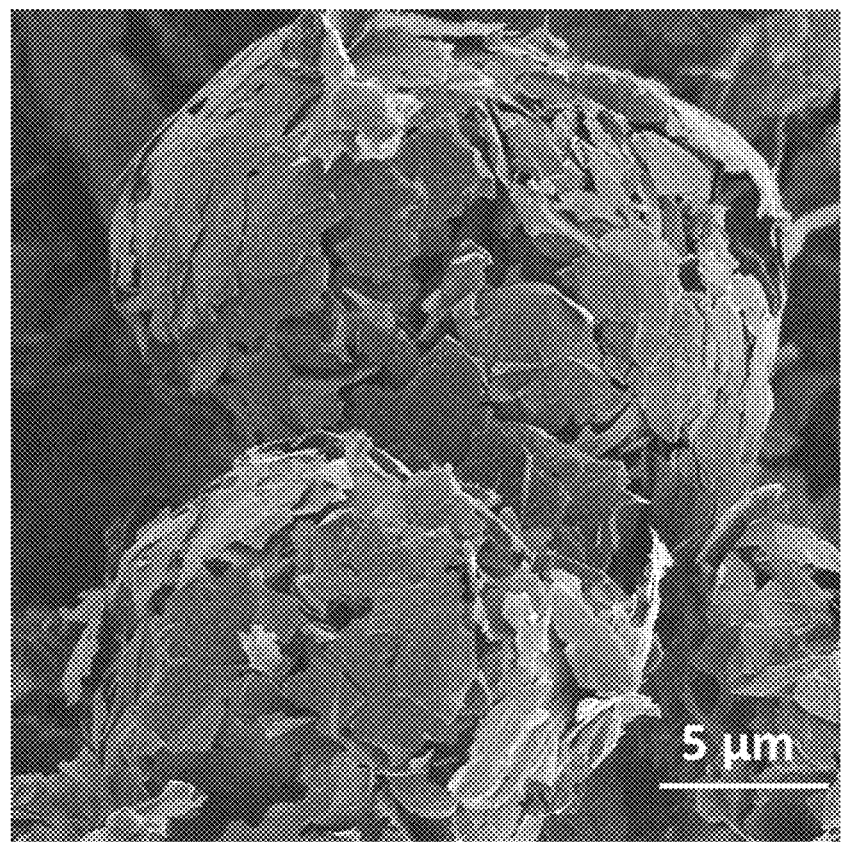
FIG. 6 is a SEM image of the graphene powder G-2 obtained in Example 2.

FIG. 6 was a SEM image of the graphene powder G-2 obtained in Example 2. As can be seen from FIG. 6, G-2 was in a structure formed by the accumulating of graphene sheets, with a particle size of 22-25 μm. There were voids between the graphene sheets.

Figure 7:
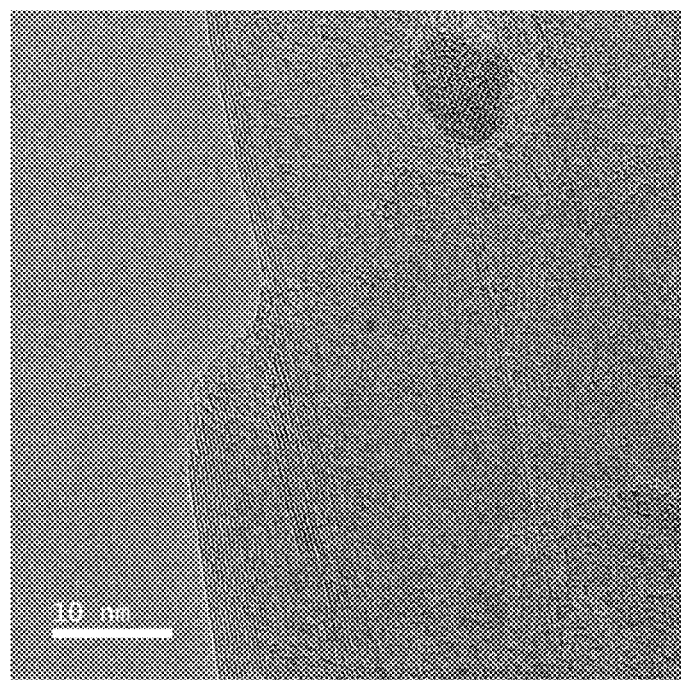
FIG. 7 is a HR-TEM image of the graphene powder G-2 obtained in Example 2.

FIG. 7 was a HR-TEM image of the graphene powder G-2 obtained in Example 2. As shown by the lattice stripes in FIG. 7, the graphene sheets in G-2 were a few-layer graphene with 5-8 layers of graphene, with a thickness of approximately 1.5 nm-2.4 nm. As measured by the test as described above, the graphene sheets had a median particle size of 6.7 μm. The product G-2 involved a D peak at 1346 cm$^{-1}$ and a G peak at 1569 cm$^{-1}$ with a ratio of their peak heights ($I_D/I_G$) of 0.08, indicating that G-2 had fewer defects. In addition, G-2 also showed a significant 2D peak at 2692 cm$^{-1}$, confirming that G-2 was a stack of few layers of graphene.

In addition, by the test described above, a XRD spectrum of G-2 was obtained. It only showed a significant diffraction peak at 26.63°, without any impurity peaks. It indicated that G-2 involved no impurity phase formed by oxidizing or by doping of impurity elements.

As measured by the tests as described above, G-2 had a carbon content of 99.95 wt %, an oxygen content of 200 ppm, a starting temperature for thermal decomposition of 640° C., a thermal-loss rate of 7% at 800° C., a conductivity of 2000 S/cm, a tap density of 0.021 g/cm$^3$, a specific surface area of 220 m$^2$/g, and a solvent residue level of 0.1%.

Example 3

(1) 100 g (75 mesh) of the expandable graphite was subjected to pre-expanding at 900° C. for 40 seconds to obtain a pre-expanded graphite. As measured by the tests described above, the pre-expanded graphite had an expansion ratio of 300 times.

(2) 10 g of the pre-expanded graphite, 0.25 g of wetting agent (Surfonic T-10, with HLB of 12.4), 239.75 g of deionized water were added together into a high-pressure homogenizer to homogenize at 30 MPa for 30 min, and then homogenize at an increased pressure of 45 MPa for 30 min, to obtain a slurry containing graphene powder.

(3) The slurry was subjected to drying in a spray drying equipment, wherein the air inlet temperature was 350° C., the air outlet temperature was 100° C., the rotating speed of the centrifugal disc of the spray drying equipment was 20000 rpm. The powder collected at the outlet was graphene powder G-3.

By the tests described above, a SEM image and a XRD spectrum of G-3 were obtained. As can be seen from the SEM image of G-3, G-3 was in a structure formed by the accumulating of graphene sheets, with a particle size of 20-25 µm. There were voids between the graphene sheets. As shown from the results of HR-TEM, the graphene sheets in G-3 were a few-layer graphene with 4-6 layers of graphene, with a thickness of approximately 1.2 nm-1.8 nm. As shown from data of dynamic light scattering, the graphene sheets had a median particle size of 10 µm. As shown in the Raman spectrum, G-3 involved a D peak at 1351 cm$^{-1}$ and a G peak at 1572 cm$^{-1}$ with a ratio of their peak heights ($I_D/I_G$) of 0.09, indicating that G-3 had fewer defects. In addition, G-3 also showed a significant 2D peak at 2702 cm$^{-1}$, confirming that G-3 was a stack of few layers of graphene. In addition, in the XRD spectrum of G-3, it only showed a significant diffraction peak at 26.63°, without any impurity peaks. It indicated that G-3 involved no impurity phase formed by oxidizing or by doping of impurity elements.

As measured by the tests as described above, G-3 had a carbon content of 99.82 wt %, an oxygen content of 260 ppm, a starting temperature for thermal decomposition of 655° C., a thermal-loss rate of 8.4% at 800° C., a conductivity of 1800 S/cm, a tap density of 0.031 g/cm$^3$, a specific surface area of 120 m$^2$/g, and a solvent residue level of 0.1%.

Example 4

(1) 100 g (75 mesh) of the expandable graphite was subjected to pre-expanding at 900° C. for 40 seconds to obtain a pre-expanded graphite. As measured by the tests described above, the pre-expanded graphite had an expansion ratio of 300 times.

(2) 10 g of the pre-expanded graphite, 0.25 g of wetting agent (Surfonic T-10, with HLB of 12.4), 239.75 g of deionized water were added together into a high-pressure homogenizer to homogenize at 30 MPa for 60 min, and then homogenize at an increased pressure of 45 MPa for 30 min, to obtain a slurry containing graphene powder.

(3) The slurry was subjected to drying in a spray drying equipment, wherein the air inlet temperature was 350° C., the air outlet temperature was 100° C., the rotating speed of the centrifugal disc of the spray drying equipment was 20000 rpm. The powder collected at the outlet was graphene powder G-4.

Figure 16:
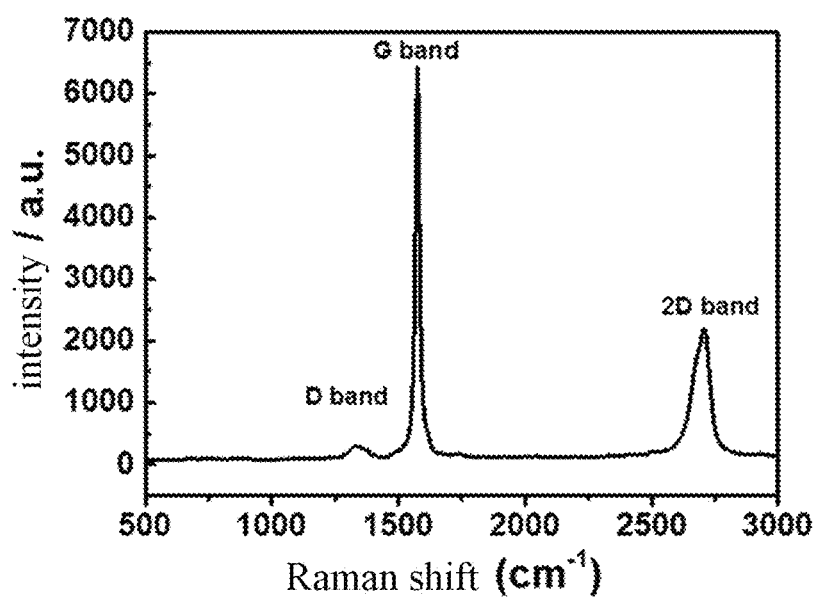
FIG. 16 is a Raman spectrum of the graphene powder G-4 obtained in Example 4.

By the tests described above, a SEM image and a XRD spectrum of G-4 were obtained. As can be seen from the SEM image of G-4, G-4 was in a structure formed by the accumulating of graphene sheets, with a particle size of 18-22 µm. There were voids between the graphene sheets. As shown from the results of HR-TEM, the graphene sheets in G-4 were a few-layer graphene with 4-6 layers of graphene, with a thickness of approximately 1.2 nm-1.8 nm. As shown from data of dynamic light scattering, the graphene sheets had a median particle size of 10 µm. As shown in the Raman spectrum in FIG. 16, G-4 involved a D peak at 1346 cm$^{-1}$ and a G peak at 1565 cm$^{-1}$ with a ratio of their peak heights ($I_D/I_G$) of 0.04, indicating that G-4 had fewer defects. In addition, G-4 also showed a significant 2D peak at 2702 cm$^{-1}$, confirming that G-4 was a stack of few layers of graphene. In addition, in the XRD spectrum of G-4, it only showed a significant diffraction peak at 26.63°, without any impurity peaks. It indicated that G-4 involved no impurity phase formed by oxidizing or by doping of impurity elements.

As measured by the tests as described above, G-4 had a carbon content of 99.85 wt %, an oxygen content of 140 ppm, a starting temperature for thermal decomposition of 640° C., a thermal-loss rate of 6.7% at 800° C., a conductivity of 2000 S/cm, a tap density of 0.029 g/cm$^3$, a specific surface area of 140 m$^2$/g, and a solvent residue level of 0.1%.

The assembling in Example 1 was repeated except that the graphene powder G-1 obtained in Example 1 was replaced with G-4 obtained in Example 4, to assemble a coin cell. The coin cell was subjected to tests to characterize the cycle performances at different current rates. The results were showed in FIG. 17.

Comparative Example 1

(1) 100 g (75 mesh) of the expandable graphite was subjected to pre-expanding at 900° C. for 20 seconds to obtain a pre-expanded graphite. As measured by the tests described above, the pre-expanded graphite had an expansion ratio of 220 times.

(2) 10 g of the pre-expanded graphite, 0.25 g of wetting agent (Teric N6, with HLB of 10.9, an alkylphenol polyoxyethylene ether), 239.75 g of deionized water were added together into a high-pressure homogenizer to homogenize at 30 MPa for 30 min, and then homogenize at an increased pressure of 45 MPa for 30 min, to obtain a slurry containing graphene powder.

(3) The slurry was subjected to drying in a spray drying equipment, wherein the air inlet temperature was 350° C., the air outlet temperature was 100° C., the rotating speed of the centrifugal disc of the spray drying equipment was 20000 rpm. The powder collected at the outlet was graphene powder DG-1.

Figure 8:
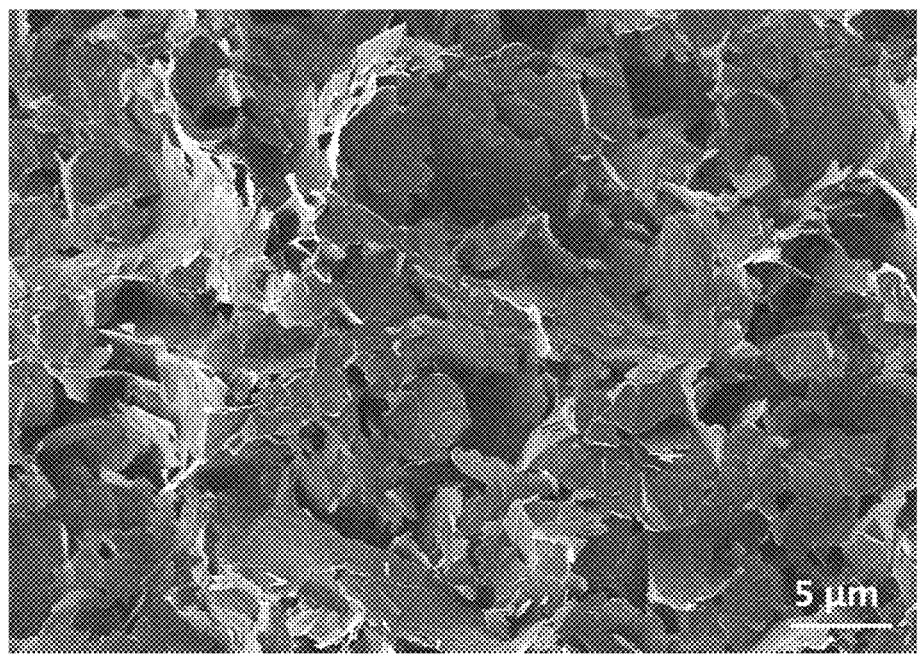
FIG. 8 is a SEM image of the graphene powder DG-1 obtained in Comparative Example 1.

By the tests described above, a SEM image of DG-1 was obtained and showed in FIG. 8. As can be seen from the figure, the graphene sheets in DG-1 were disorderly accumulated. DG-1 had not a definite particle size.

Figure 14:
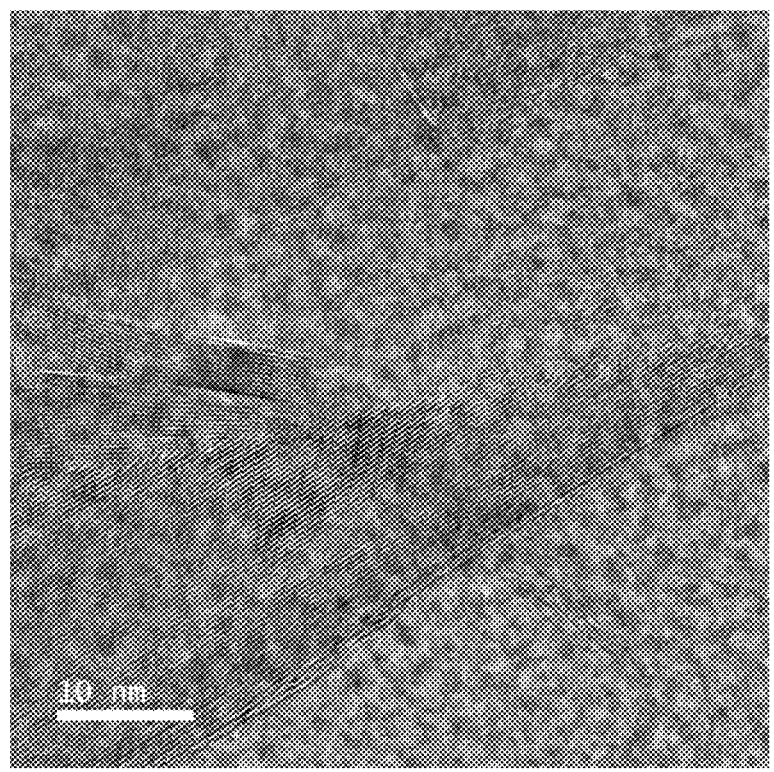
FIG. 14 is a HR-TEM image of the graphene powder DG-1 obtained in Comparative Example 1.

FIG. 14 was a HR-TEM image of DG-1. As can be seen from the figure, the graphene sheets in DG-1 were in a layer structure having 15-20 layers of graphene, with a thickness of approximately 4.5 nm-6 nm.

Figure 15:
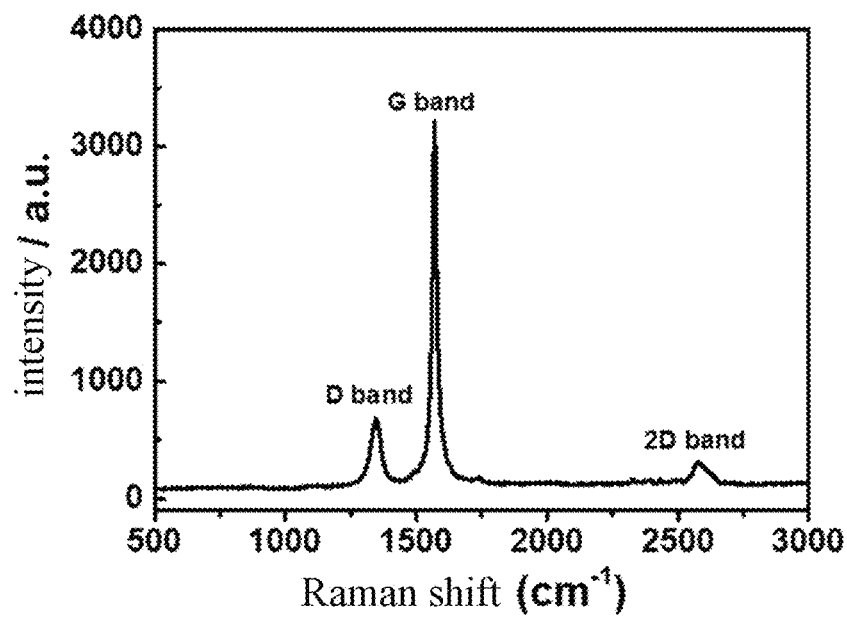
FIG. 15 is a Raman spectrum of the graphene powder DG-1 obtained in Comparative Example 1.

FIG. 15 was a Raman spectrum of DG-1. As can be seen from the figure, DG-1 involved a D peak at 1351 cm$^{-1}$ and a G peak at 1514 cm$^{-1}$ with a ratio of their peak heights ($I_D/I_G$) of 0.25, indicating that DG-1 had defects substantially more than G-1. In addition, DG-1 also showed a 2D peak at 2702 cm$^{-1}$, which was a broad peak and not significant, confirming that the graphene sheets in DG-1 were in a layer structure comprising more layers of graphene.

As measured by the tests as described above, DG-1 had a carbon content of 99.32 wt %, an oxygen content of 240 ppm, a starting temperature for thermal decomposition of 620° C., a thermal-loss rate of 9.2% at 800° C., a conductivity of 800 S/cm, a tap density of 0.042 g/cm$^3$, a specific surface area of 60 m$^2$/g, and a solvent residue level of 0.25%.

Comparative Example 2

(1) 100 g (75 mesh) of the expandable graphite was subjected to pre-expanding at 900° C. for 20 seconds to obtain a pre-expanded graphite. As measured by the tests described above, the pre-expanded graphite had an expansion ratio of 220 times.

(2) 10 g of the pre-expanded graphite, 0.25 g of wetting agent (Surfonic T-10, with HLB of 12.4), 239.75 g of deionized water were added together into a high-pressure homogenizer to homogenize at 30 MPa for 60 min, to obtain a slurry containing graphene powder.

(3) The slurry was subjected to drying in a spray drying equipment, wherein the air inlet temperature was 350° C., the air outlet temperature was 100° C., the rotating speed of the centrifugal disc of the spray drying equipment was 20000 rpm. The powder collected at the outlet was graphene powder DG-2.

By the tests described above, a SEM image, a HR-TEM image and a Raman spectrum of DG-2 were obtained. As can be seen from the SEM image of DG-2, the graphene sheets in DG-2 were disorderly accumulated. DG-2 had not a definite particle size. As can be seen from the HR-TEM image, the graphene sheets in DG-2 were in a layer structure having 10-15 layers of graphene, with a thickness of approximately 3 nm-4.5 nm. As can be seen from the Raman spectrum of DG-2, DG-2 involved a D peak at 1351 cm$^{-1}$ and a G peak at 1514 cm$^{-1}$ with a ratio of their peak heights ($I_D/I_G$) of 0.2, indicating that DG-2 had defects substantially more than G-1. In addition, DG-2 showed a 2D peak at 2702 cm$^{-1}$, which was a broad peak, indicating the presence of few-layer graphene in low amount in DG-2.

As measured by the tests as described above, DG-2 had a carbon content of 99.95 wt %, an oxygen content of 140 ppm, a starting temperature for thermal decomposition of 640° C., a thermal-loss rate of 7% at 800° C., a conductivity of 500 S/cm, a tap density of 0.08 g/cm$^3$, a specific surface area of 12 m$^2$/g, and a solvent residue level of 0.1%.

Comparative Example 3

(1) 100 g (75 mesh) of the expandable graphite was subjected to pre-expanding at 900° C. for 20 seconds to obtain a pre-expanded graphite. As measured by the tests described above, the pre-expanded graphite had an expansion ratio of 220 times.

(2) 10 g of the pre-expanded graphite, 0.25 g of wetting agent (Surfonic T-10, with HLB of 12.4), 239.75 g of deionized water were added together into a high-pressure homogenizer to homogenize at 45 MPa for 60 min, to obtain a slurry containing graphene powder.

(3) The slurry was subjected to drying in a spray drying equipment, wherein the air inlet temperature was 350° C., the air outlet temperature was 100° C., the rotating speed of the centrifugal disc of the spray drying equipment was 20000 rpm. The powder collected at the outlet was graphene powder DG-3.

By the tests described above, a SEM image, a HR-TEM image and a Raman spectrum of DG-3 were obtained. As can be seen from the SEM image of DG-3, DG-3 had not a definite particle size. As can be seen from the HR-TEM image of DG-3, the graphene sheets in DG-3 were a few-layer graphene with 4-6 layers of graphene, with a thickness of approximately 1.2 nm-1.9 nm. As can be seen from the Raman spectrum of DG-3, DG-3 involved a D peak at 1354 cm"1 and a G peak at 1574 cm$^{-1}$ with a ratio of their peak heights ($I_D/I_G$) of 0.13, indicating that DG-3 had few defects and was closed to G-1. In addition, DG-3 showed a 2D peak at 2709 cm$^{-1}$, which was a sharp peak, indicating that the graphene sheets in DG-3 were a few-layer graphene. Due to the fact that DG-3 had a broad distribution of particle size, it is disadvantageous to industrial application.

As measured by the tests as described above, DG-3 had a carbon content of 99.95 wt %, an oxygen content of 140 ppm, a starting temperature for thermal decomposition of 640° C., a thermal-loss rate of 7% at 800° C., a conductivity of 1600 S/cm, a tap density of 0.018 g/cm$^3$, a specific surface area of 200 m$^2$/g, and a solvent residue level of 0.1%.

The assembling in Example 1 was repeated except that the graphene powder G-1 obtained in Example 1 was replaced with DG-3 obtained in Comparative Example 3, to assemble a coin cell. The coin cell was subjected to tests to characterize the cycle performances at different current rates. The results were showed in FIG. 18.

Comparative Example 4

The assembling in Example 1 was repeated except that the graphene powder G-1 obtained in Example 1 was replaced with the commercially available Super P conductive agent, to assemble a coin cell. The coin cell was subjected to tests to characterize the cycle performances at different current rates. The results were showed in FIG. 10.

Figure 9:
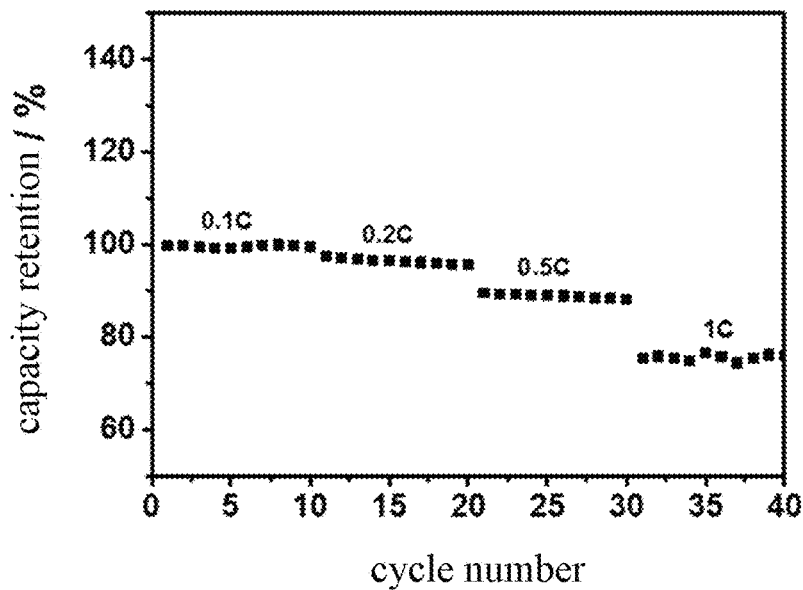
FIG. 9 shows the cycle performances at different current rates of the coin cell with a negative electrode containing the graphene powder G-1 obtained in Example 1 as the negative conductive agent and a silicon-carbon material as the negative active material.
Figure 10:
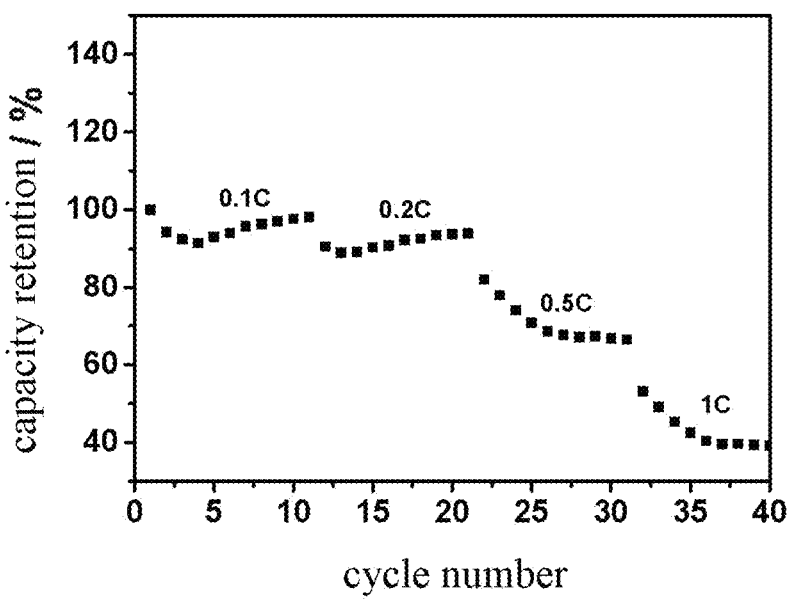
FIG. 10 shows the cycle performances at different current rates of the coin cell with a negative electrode containing Super P as the negative conductive agent and a silicon-carbon material as the negative active material in Comparative Example 4.

As shown in FIG. 9, when using the graphene powder G-1 obtained in Example 1 as the conductive agent, the coin cell had capacity retention of 100%, 97%, 90%, and 78%, respectively, at current rates of 0.1C/0.2C/0.5C/1C. As shown in FIG. 10, when using the commercially available Super P as the conductive agent, the coin cell had capacity retention of 96%, 92%, 68%, and 40%, respectively, at current rates of 0.1C/0.2C/0.5C/1C. The above results indicated that the graphene powder in accordance with the present disclosure imparted the coin cell with more excellent stability.

Figure 17:
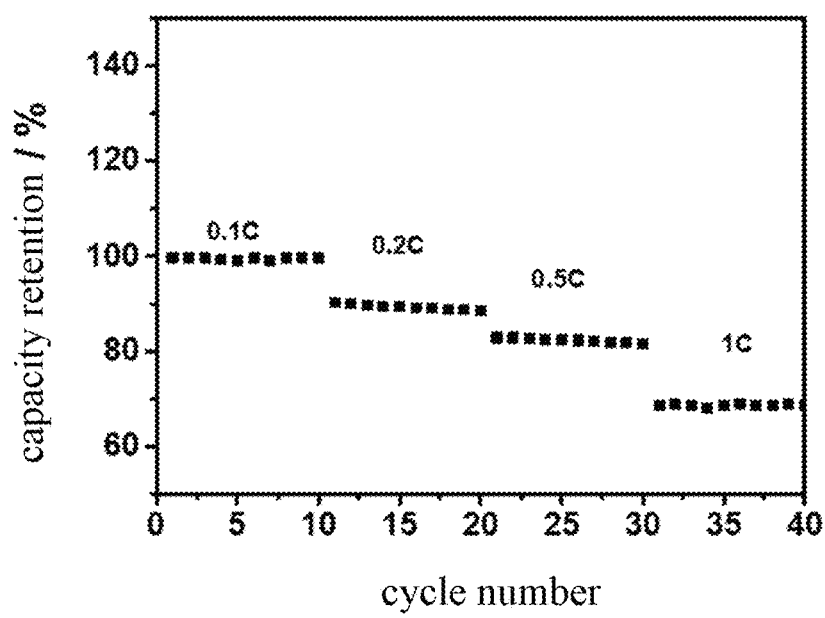
FIG. 17 shows the cycle performances at different current rates of the coin cell with the graphene powder G-4 obtained in Example 4 as the negative conductive agent and a silicon-carbon material as the negative active material in the negative electrode.
Figure 18:
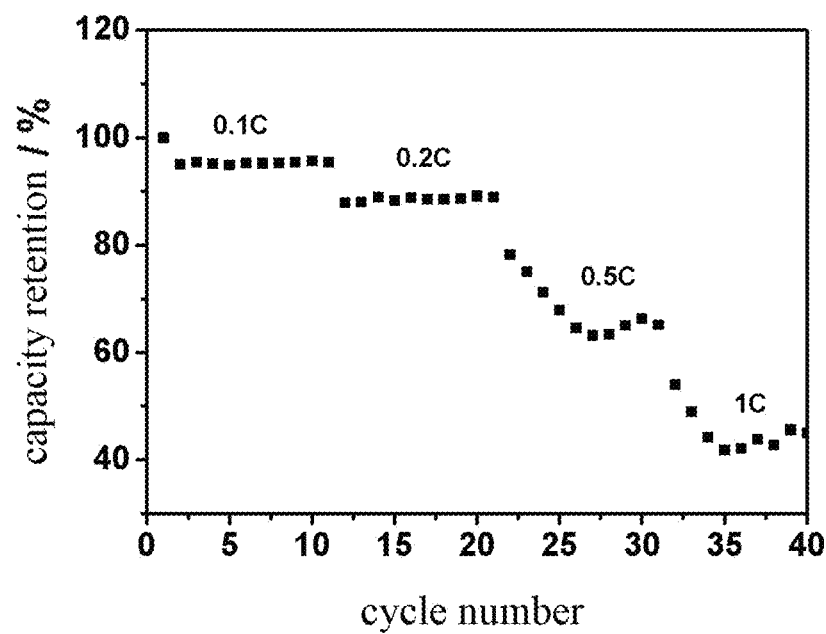
FIG. 18 shows the cycle performances at different current rates of the coin cell with the graphene powder DG-3 obtained in Comparative Example 3 as the negative conductive agent and a silicon-carbon material as the negative active material in the negative electrode.

As shown in FIG. 17, when using G-4 as the conductive agent, the coin cell had capacity retention of 100%, 91%, 83%, and 69%, respectively, at current rates of 0.1C/0.2C/0.5C/1C. As shown in FIG. 18, when using DG-3 as the conductive agent, the coin cell had capacity retention of 95%, 89%, 64%, and 42%, respectively, at current rates of 0.1C/0.2C/0.5C/1C. Both of them achieved capacity retention lower than those obtained with G-1 as the conductive agent. When using DG-3 as the conductive agent, the stability was substantially reduced at corresponding current rates.

Figure 11:
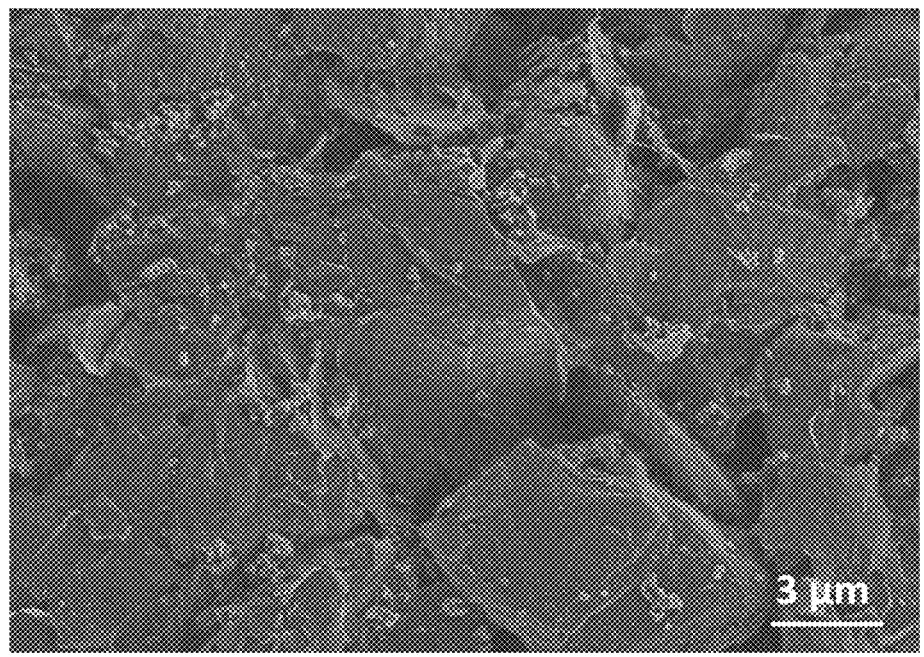
FIG. 11 shows a SEM image (top view) of the negative electrode having the graphene powder G-1 as the negative conductive agent in Example 1.
Figure 12:
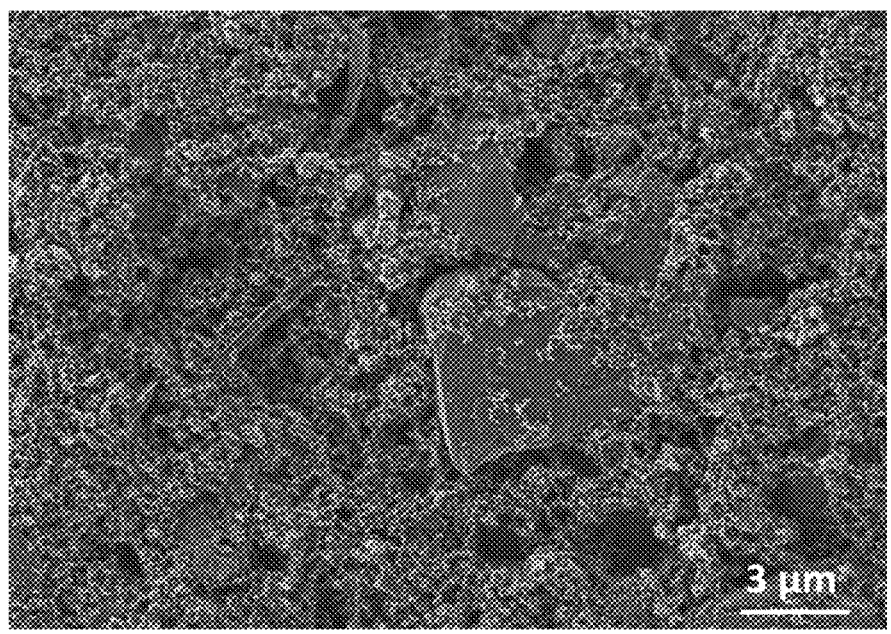
FIG. 12 shows a SEM image (top view) of the negative electrode having the commercially available Super P as the negative conductive agent in Comparative Example 4.

FIG. 11 showed morphology of the negative electrode having the graphene powder G-1 as the conductive agent in Example 1. FIG. 12 showed morphology of the negative electrode having Super P as the conductive agent. They clearly showed that the two negative electrodes had significant difference in morphology. As can be seen from FIG. 11, the graphene sheets in the graphene powder in accordance with the present disclosure were complete and had a large radial size. Therefore, when using the graphene powder in accordance with the present disclosure as a conductive agent, the dispersed large-size graphene sheets increased the contact area between them and electrode active material(s). It provided more pathways in the electrode active material(s) for transferring electrons, facilitating the formation of a network for the planar conduction of electrons inside the obtained electrode, resulting in excellent conductivity (3200 S/cm), reducing the internal resistance of the electrode, and improving the rate performance of the battery. Moreover, the flexibility associated with graphene sheets buffered the volume expansion of the silicon-carbon negative electrode material during charge-discharge cycling, which improved the cycle performances of the battery. As shown in FIG. 12, Super P was dispersed between the silicon-carbon negative electrode materials. Accordingly, electrons were linearly conducted. It did not contribute anything to alleviating the volume expansion of the silicon-carbon negative electrode materials, either.

Example 5

A zinc powder containing epoxy anti-corrosion resin was prepared by: weighting an epoxy resin and an inorganic zinc powder in the required amounts, and evenly mixing them, to obtain the zinc powder containing epoxy anti-corrosion resin.

Figure 13:
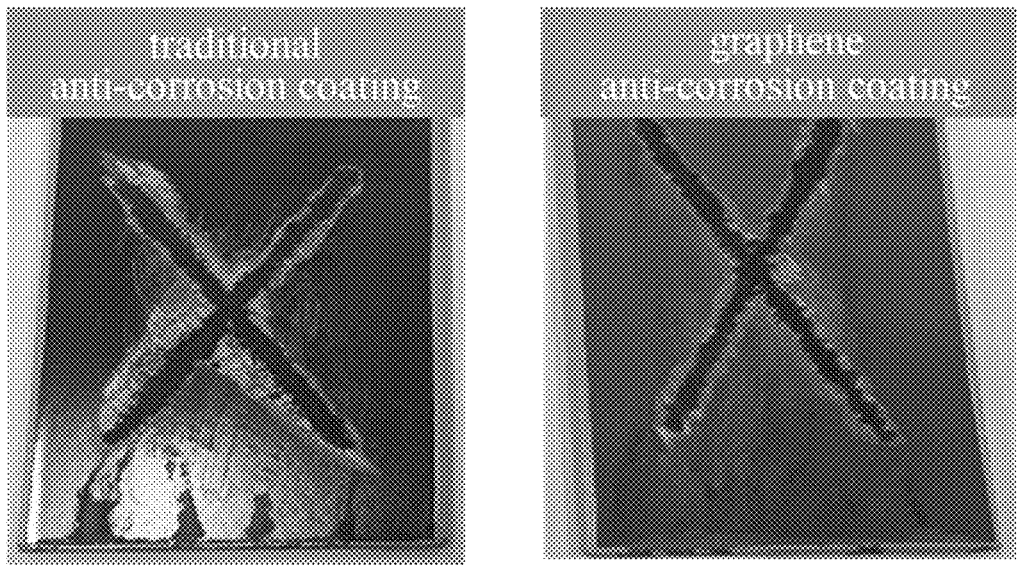
FIG. 13 shows the results of the neutral salt spray test on marking lines of anti-corrosion coatings on a carbon steel substrate in Example 5, where the left is the result for a traditional anti-corrosion coating (containing 80% zinc) and the right is the result for a coating with the graphene powder (containing 30% zinc)

1 g of the graphene powder G-1 obtained in Example 1 was added into 999 g of the zinc powder containing epoxy anti-corrosion resin (where zinc powder comprises 30% by mass of the epoxy anti-corrosion resin). After evenly mixing, the mixture was coated on the surface of a cleaned carbon steel test piece, to form a film with thickness of 90 μm. In addition, 1000 g of the zinc powder containing epoxy anti-corrosion resin (where zinc powder comprises 80% by mass of the epoxy anti-corrosion resin) was coated on the surface of a cleaned carbon steel test piece, to form a film with thickness of 90 μm. The two coated carbon steel test pieces were marked with crossed lines on their surfaces according to HG/T5573-2019 and placed in a salt spray test box to be subjected to neutral salt spray test. After 1440 h, the corrosion state of the carbon steel at the marking lines on the surface was observed. The results were showed in FIG. 13. The left was the result for a traditional zinc containing epoxy anti-corrosion resin (containing 80% zinc), wherein after the salt spray test, the corrosion diffusion distance at the marking lines was 5-20 mm. The right was the result for a zinc containing epoxy anti-corrosion resin added with the graphene powder (containing 30% zinc), wherein after the salt spray test, the corrosion diffusion distance at the marking lines was 2-3 mm. Comparing the two results, the diffusion distance in the right was substantially smaller than that in the left. In addition, there were obvious rust patterns on the below substrate in the left, while there was not in the right. All the above indicated that the addition of the graphene powder substantially improved the corrosion resistance of the epoxy resin anti-corrosion coatings. Moreover, the use of the graphene powder in accordance with the present disclosure in an (epoxy resin) anti-corrosion coating substantially reduced the amount of zinc used.

The specific embodiments of the present invention have been described in detail above. However, the present invention is not limited thereto. Various simple modifications may be made to the embodiments of the present invention within the technical scope of the present invention, including the combinations of various technical features in any other suitable way. Those simple modifications and combinations should also be regarded as the contents disclosed herein and being within the protection scope of the present disclosure.

The invention claimed is:

1. A graphene powder comprising particles that each comprises a plurality of graphene sheets and voids disposed among the plurality of graphene sheets, wherein the graphene powder has a Raman spectrum with a D peak and a G peak having peak heights of ID and IG, respectively, wherein ID/IG is 0.03-0.10, and wherein the graphene powder has a carbon content of greater than or equal to 99.50%, a particle size of 20-35 μm, a specific surface area of 50-300 m²/g, and an oxygen content of 300 ppm or less.

2. The graphene powder of claim 1, wherein based on a total mass of the graphene powder, the graphene powder has a carbon content of 99.80-99.95%.

3. The graphene powder of claim 1, wherein the graphene powder has a specific surface area of 100-250 m²/g; or
   the graphene powder has a tap density of 0.02-0.04 g/cm³; or
   the graphene powder has a conductivity of 500-5000 S/cm.

4. The graphene powder of claim 1, wherein each of the graphene sheets comprises 1-10 layers of graphene; or each of the graphene sheets has a median particle size of 5-15 μm.

5. The graphene powder of claim 1, having a starting temperature for thermal decomposition of greater than or equal to 600° C.; or
   when subjected to a heat treatment under an air atmosphere at 800° C., the graphene powder has a thermal-loss rate of less than or equal to 10%.

6. The graphene powder of claim 1, having a conductivity of 500-5000 S/cm.

7. A method for preparing the graphene powder of claim 1, comprising the steps of:
   (1) subjecting an expandable graphite to pre-expanding, to obtain a pre-expanded graphite;
   (2) mixing the pre-expanded graphite obtained in step (1), a wetting agent and a solvent, and then subjecting the mixture to a first high-pressure homogenization and a second high-pressure homogenization, to obtain a slurry containing a graphene powder, wherein the pressure of the second high-pressure homogenization is 10-20 MPa higher than the pressure of the first high-pressure homogenization; and
   (3) drying the slurry containing the graphene powder obtained in step (2), to obtain the graphene powder of claim 1.

8. The method of claim 7, wherein, compared to the expandable graphite before the pre-expanding, the pre-expanded graphite obtained in step (1) has an expansion ratio of 200-300 times.

9. The method of claim 7, wherein, in step (2), the first high-pressure homogenization is operated at a pressure of 30-40 MPa for 20-60 minutes, and the second high-pressure homogenization is operated at a pressure of 40-50 MPa for 10-30 minutes.

10. The method of claim 7, wherein the wetting agent in step (2) is fatty amine polyoxyethylene ether.

11. The method of claim 7, wherein the pre-expanded graphite obtained in step (1) and the wetting agent are fed in a mass ratio of 1:0.01-0.1 in step (2).

12. The method of claim 7, wherein the drying in step (3) is spray drying or freeze-drying, wherein the spray drying is operated under conditions of: the air inlet temperature being 300-350° C., the air inlet temperature being 200-250° C. higher than the air outlet temperature, the air outlet temperature being 100-130° C., and the rotating speed of the centrifugal disc of the spray drying equipment being 20000-30000 rpm; and wherein the freeze-drying is operated under conditions of: the cold trap temperature being not higher than-65° C.; the temperature of the cubical separator being not higher than −55° C.; the heating rate being 0.1-0.5° C./min; the time for heating from the temperature of the cubical separator to 0° C. being not less than 24 hours; and the vacuum degree being not higher than 10 Pa.

* * * * *